(12) United States Patent
Mukherjee et al.

(10) Patent No.: US 12,157,961 B2
(45) Date of Patent: Dec. 3, 2024

(54) FABRIC COMPRISING BINDING AGENT THREADS

(71) Applicant: BLADE DYNAMICS LIMITED, Eastleigh (GB)

(72) Inventors: Manish Mukherjee, Eastleigh (GB); Harald Behmer, Eastleigh (GB)

(73) Assignee: BLADE DYNAMICS LIMITED, Eastleigh (GB)

( * ) Notice: Subject to any disclaimer, the term of this patent is extended or adjusted under 35 U.S.C. 154(b) by 84 days.

(21) Appl. No.: 17/996,819

(22) PCT Filed: Apr. 23, 2021

(86) PCT No.: PCT/EP2021/060718
§ 371 (c)(1),
(2) Date: Oct. 21, 2022

(87) PCT Pub. No.: WO2021/214314
PCT Pub. Date: Oct. 28, 2021

(65) Prior Publication Data
US 2023/0203727 A1 Jun. 29, 2023

(30) Foreign Application Priority Data
Apr. 23, 2020 (GB) ..................................... 2005908

(51) Int. Cl.
*D04H 3/115* (2012.01)
*B29B 11/16* (2006.01)
(Continued)

(52) U.S. Cl.
CPC .............. *D04H 3/115* (2013.01); *B29B 11/16* (2013.01); *D04H 3/12* (2013.01); *B29K 2077/00* (2013.01);
(Continued)

(58) Field of Classification Search
None
See application file for complete search history.

(56) References Cited

U.S. PATENT DOCUMENTS

| 4,913,937 A | 4/1990 | Engdahl et al. |
| 6,277,469 B1 | 8/2001 | Wildeman |

(Continued)

FOREIGN PATENT DOCUMENTS

| EP | 0073648 A2 | 8/1982 |
| EP | 2921583 A1 | 9/2015 |

(Continued)

OTHER PUBLICATIONS

Machine translation of JP 2002227068 A (Year: 2024).*

*Primary Examiner* — Alexander S Thomas
(74) *Attorney, Agent, or Firm* — Nath, Goldberg & Meyer; Jerald L. Meyer; Tanya E. Harkins

(57) ABSTRACT

The present invention relates to a non-woven fabric comprising one or more fibre layers each comprising a plurality of fibres arranged along a fibre direction, wherein the non-woven fabric comprises a plurality of stitching rows, each stitching row comprising one or more threads arranged along a stitch direction, for maintaining arrangement of the plurality of fibres in the one or more fibre layers relative to each other, wherein at least one thread comprises a binding agent. The present invention further relates to preforms comprising the non-woven fabric according to the present invention and methods for producing the non-woven fabric, preforms and wind turbine blades.

19 Claims, 10 Drawing Sheets

(51) Int. Cl.
*D04H 3/12* (2006.01)
*B29K 77/00* (2006.01)
*B32B 5/06* (2006.01)
*B32B 5/10* (2006.01)

(52) U.S. Cl.
CPC ........... *B29K 2867/00* (2013.01); *B32B 5/073* (2021.05); *B32B 5/10* (2013.01)

(56) References Cited

U.S. PATENT DOCUMENTS

| | | |
|---|---|---|
| 2007/0087642 A1 | 4/2007 | Bridgeman et al. |
| 2010/0228216 A1 | 9/2010 | Gillies |

FOREIGN PATENT DOCUMENTS

| | | |
|---|---|---|
| GB | 1038925 | 8/1966 |
| GB | 1456049 | 11/1976 |
| JP | 2002227068 A | 8/2002 |
| WO | 0216481 A1 | 2/2002 |
| WO | 2007041782 A1 | 4/2007 |

\* cited by examiner

FABRIC COMPRISING BINDING AGENT THREADS

This is a National Phase Application filed under 35 U.S.C. 371 as a national stage of PCT/EP2021/060718, filed Apr. 23, 2021, an application claiming the benefit of Great Britain Application No. 2005908.5, filed Apr. 23, 2020, the content of each of which is hereby incorporated by reference in its entirety.

FIELD OF INVENTION

The present invention relates to preforms, particularly preforms for manufacturing wind turbine blades. Specifically, the present invention relates to preforms made from non-woven fabrics comprising a binding agent. Furthermore, the present invention relates to methods of manufacturing such non-woven fabrics, preforms and wind turbine blades.

BACKGROUND OF THE INVENTION

The blades of modern wind turbines capture kinetic wind energy by using sophisticated blade design created to maximise efficiency. A major trend in wind turbine development is the increase in size to reduce the leveraged cost of energy. There is an increasing demand for large wind blades which may exceed 80 metres in length and 4 metres in width. The blades are typically made from a fibre-reinforced polymer material and comprise a pressure side shell half and a suction side shell half. The cross-sectional profile of a typical blade includes an airfoil for creating an air flow leading to a pressure difference between the two sides. The resulting lift force generates torque for producing electricity.

The shell halves of wind turbine blades are usually manufactured using blade moulds. First, a blade gel coat or primer is applied to the mould. Subsequently, fibre reinforcement and/or fabrics are placed into the mould in layers followed by resin infusion. The resulting shell halves are assembled by being glued or bolted together substantially along a chord plane of the blade. In many cases, wind turbine blades are made in large parts, e.g., as two aeroshells with load-carrying spar caps and internal webs that are then bonded together.

As blades are getting longer and their shapes getting increasingly complex, the accuracy and placements of the layers over the geometry of the mould are prone to manufacturing defects, e.g. caused by wrinkles in fibre material. A major issue is that many of these defects are not easily detectable since the damage does not necessarily originate from the external surfaces and may not be visible. These defects may be detrimental to the overall aerodynamic performance of the blade, the overall strength of the blade and the expected lifetime. Thus, after manufacturing, the blades are subjected to quality control and manufacturing defects are repaired. Furthermore, since large blades represent a large value of materials, increasing blade sizes mean that it becomes less and less attractive to discard blades with manufacturing defects.

To decrease the occurrence of manufacturing defects, smaller preforms of fabrics can be placed together to reduce cycle time and improve quality. Preforms are a plurality of precut fabrics that can be assembled and consolidated out of the mould and then collectively placed in the shell mould. The preforms are made with a "binding" agent that fuses and keeps the layers consolidated. The binding agents can be applied as powder and/or sprayed between each layer. However, this is very time consuming. In general, the layup time is already one of the biggest contributors to the cycle time to manufacture a blade.

Hence, improved methods for manufacturing of larger blades with less defects and decreased manufacturing time would be advantageous.

OBJECT OF THE INVENTION

Thus, an object of the present invention is to provide a method of manufacturing a wind turbine blade or parts thereof resulting in less manufacturing defects and decreased manufacturing time. It is a further an object of the present invention to provide a method of manufacturing a wind turbine blade which is cost-effective.

SUMMARY OF INVENTION

The present inventors have found that one or more of said objects may be achieved in a first aspect of the invention relating to a non-woven fabric comprising one or more fibre layers each comprising a plurality of fibres optionally arranged along a fibre direction (i.e. the individual fibres may extend along the fibre direction), wherein the non-woven fabric comprises a plurality of stitching rows, each stitching row comprising one or more threads arranged along a stitch direction, for maintaining arrangement of the plurality of fibres in the one or more fibre layers relative to each other, wherein at least one thread comprises a binding agent.

Thus, the non-woven fabric comprises one or more fibre layers including a first fibre layer comprising a plurality of first fibres optionally arranged along a first fibre direction, wherein the non-woven fabric comprises a plurality of stitching rows for maintaining arrangement of the plurality of fibres in the one or more fibre layers, the plurality of stitching rows includes a first stitching row arranged along a first stitch direction, the first stitching row comprises one or more first threads including a first primary thread, the first primary thread comprising a binding agent.

The presence of binding agent within one or more layers of the non-woven fabric, affects the adherence properties as well as the rigidity of the one or more layers. In areas comprising binding agent, the one or more layers can adhere to other layers, e.g. by heating to allow melting of the binding agent and subsequent cooling to allow adherence. However, areas comprising binding agent may tend to become more rigid and difficult to handle. By using a thread comprising a binding agent in one or more areas of the non-woven fabric, the amount of binding agent within different areas of the non-woven fabric can be controlled. In this way, the rigidity and adherence properties of the non-woven fabric can be controlled. It may be advantageous to have some areas with adherence properties and some areas, where adherence is not needed, without or with less adherence properties, but then also being less rigid and easier to handle. Furthermore, it may be advantageous that some areas do not adhere, thereby allowing a certain degree of drapability between layers of the preform in designated areas, while other areas of the preform adhere together.

It is a further advantage of the present invention that adhesive properties of the non-woven fabric, caused by the binding agent, and stability of the fabric prior to consolidation, caused by the stitching and threads, are provided by the same element and by the same manufacturing step. Thereby saving manufacturing time and costs.

In some embodiments, the non-woven fabric comprises a single fibre layer i.e. the first fibre layer, comprising a plurality of first fibres arranged along a first fibre direction. The plurality of first fibres are arranged adjacent to each other and in close proximity. The first plurality of fibres are stitched together by a plurality of stitching rows such as to maintain the arrangement of the plurality of fibres relative to each other in the first fibre direction, such as to form a coherent layer structure i.e. the non-woven fabric.

In some embodiments, the non-woven fabric comprises more than one layer, e.g. comprising the first fibre layer and a second fibre layer. If the non-woven fabric comprises more than one layer, the fibres of each layer may be arranged on top of each other. In theory the non-woven fabric can contain any number of layers. However, the number of layers of the non-woven fabric is preferably between 1 and 6, more preferably between 1 and 4 layers, e.g. 2 or 3 layers.

Preferably, each layer comprises a plurality of fibres arranged along one fibre direction, such that a first layer comprises a plurality of first fibres arranged along a first fibre direction, a second layer comprises a plurality of second fibres arranged along a second fibre direction, a third layer comprises a plurality of third fibres arranged along a third fibre direction etc.

The fibre direction of some of the fibre layers in a non-woven fabric may be the same, but preferably the fibre direction of each fibre layer is different from any of the other fibre layers. Preferably, the fibre direction of each fibre layer is offset relative to every other fibre layer in the non-woven fabric by a smallest fibre angle between 30-90 degrees. If two fibres are arranged with two different directions, then two angles will always exist between them, unless the angle between them is 90 degrees, with one angle being smaller than the other. The smallest fibre angle refers to the smaller of the two angles.

In some embodiments, the non-woven fabric comprises two fibre layers e.g. the first fibre layer and the second fibre layer comprising a plurality of fibres arranged along the first fibre direction and a second fibre direction, respectively. In such embodiments, the first fibre direction may be offset from the second fibre direction by a smallest fibre angle between 30-90 degrees, preferably 90 degrees.

In some embodiments, the non-woven fabric comprises three fibre layers, e.g. the first fibre layer, the second fibre layer and the third fibre layer, arranged along a first, second and third fibre direction, respectively. In such embodiments, the first fibre direction may be offset from the second fibre direction by a smallest fibre angle between 30-90 degrees, such as 60 degrees, and from the third fibre direction by a smallest fibre angle between 30-90 degrees, such as 60 degrees. Furthermore, the second fibre direction may be offset from the third fibre direction by a smallest fibre angle between 30-90 degrees, such as 60 degrees. In this way, the three fibre layers may be offset from each other with the same smallest fibre angle, i.e. 60 degrees.

In other embodiments, the non-woven fabric comprises four, five, six or more fibre layers, which may all be offset from each other with a smallest fibre angle between 30-90 degrees, such as 45 degrees, 36 degrees or 30 degrees, respectively.

In embodiments where the non-woven fabric comprises more than one fibre layer arranged on top of each other as described above, the fibre layers may be stitched together such as to maintain the arrangement of the plurality of fibres in each layer relative to each other, and to maintain the arrangement of the plurality of fibres in each fibre layer relative to the plurality of fibres in the other layers.

The one or more fibre layers may be stitched together by a plurality of stitching rows. The plurality of stitching rows together forms a stitching pattern in the non-woven fabric, maintaining the plurality of fibres in each fibre layer relative to each other and/or maintaining the fibre layers relative to the other fibre layers in the non-woven fabric.

The stitch direction of each stitching row depends on the desired pattern and strength of the non-woven fabric. In theory, the invention would work with a plurality of stitching patterns, with multiple stitch directions for different stitching rows. However, a symmetric stitching pattern is preferred.

The plurality of stitching rows comprises at least a first stitching row arranged along a first stitch direction. Preferably, the first stitching row extends from a primary edge of the non-woven fabric to a secondary edge of the non-woven fabric. The secondary edge may be opposite the primary edge.

The plurality of stitching rows may further comprise a second stitching row arranged along a second stitch direction, a third stitching row arranged along a third stitch direction, a fourth stitching row arranged along a fourth stitch direction etc.

In some embodiments, the first stitch direction of the first stitching row is perpendicular to the second stitch direction of the second stitching row and/or perpendicular to the third stitch direction of the third stitching row.

In some embodiments, the first stitch direction of the first stitching row is parallel to the second stitch direction of the second stitching row and/or parallel to the third stitch direction of the third stitching row.

However, preferably, a first plurality of stitching rows, which may include the first stitching row and the third stitching row, is all arranged parallel to each other along the first stitch direction of the non-woven fabric. Preferably, the first plurality of stitching rows extends from the primary edge of the non-woven fabric to the secondary edge of the non-woven fabric e.g. along the whole width of the non-woven fabric.

Furthermore, the plurality of stitching rows may comprise a second plurality of stitching rows, which may include the second stitching row and the fourth stitching row, all arranged parallel to each other along the second stitch direction of the non-woven fabric, wherein the second stitch direction is different from the first stitch direction. Preferably, the second plurality of stitching rows extends from a tertiary edge of the non-woven fabric to a quaternary edge of the non-woven fabric e.g. along the width or the length of the non-woven fabric.

In some embodiments, the second stitch direction of the second plurality of stitching rows is perpendicular to the first stitch direction of the first plurality of stitching rows.

The number of stitching rows in the non-woven fabric may depend on the size of the non-woven fabric and may therefore best be defined by the distance between each stitching row.

In some embodiments, the first stitching row and the second stitching row are separated by a distance of between 0.5-2 cm, such as 0.5-1.5 cm, such as 1 cm.

In some embodiments, the distance between a first plurality of stitching rows is the same between each stitching row and between 0.5-2 cm, such as 0.5-1.5 cm, such as 1 cm. Furthermore, if present, the distance between the second, third, fourth etc. plurality of stitching rows may be the same and may be between 0.5-2 cm, such as 0.5-1.5 cm, such as 1 cm.

A preferred stitch direction for the first plurality of stitching rows exists depending on the number of fibre layers in the non-woven fabric.

In embodiments where the non-woven fabric comprises a single fibre layer, the stitch direction of a first plurality of stitching rows is preferably perpendicular to the first fibre direction i.e. the direction of the plurality of fibres in the first fibre layer. This is advantageous, as such a stitch direction relative to the direction of the plurality of fibres in the first fibre layer provides a strong fabric.

In embodiments where the non-woven fabric comprises two or more fibre layers, the stitch direction is preferably offset from one of the fibre directions by half the fibre angle. Thus, if the fibre angle between a first layer and a second layer is 90 degrees, and the first stitch direction and the first fibre direction are separated by half of the first fibre angle and/or the first stitch direction and the second fibre direction are separated by half of the first and/or second fibre angle, the plurality of stitching rows are preferably arranged in a stitch direction being 45 degrees relative to each of the first and/or second fibre direction. This is advantageous, as such a stitch direction relative to the direction of the plurality of fibres in the first and second fibre layer provides a strong fabric.

Each stitching row may in itself comprise a stitching row pattern. In theory, the stitching rows may have any stitching row pattern known to the person skilled in the art.

In some embodiments, the stitching row pattern is a straight line, whereas in other embodiments the stitching row pattern is a zig-zag pattern, e.g. having a width of between 0.1-1 cm, such as 0.2-0.5 cm. In still other embodiments, the stitching row pattern may be a diamond shaped pattern, e.g. having a width of between 0.1-1 cm, such as 0.2-0.5 cm.

In some embodiments the stitching row pattern may comprise a combination of the mentioned patterns, e.g. a straight line and a zig-zag pattern and/or a diamond shaped pattern.

The seam size and stitch type contribute to determining the amount of thread being present at an upper or lower surface of the non-woven fabric i.e. in contact with one or two other layers. The seam size further determines the rigidity and strength of the fabric. The seam size is preferably between 0.05-0.5 cm. The stitch type may be any stitch type known by a person skilled in the art.

In some embodiments, the first stitching row, the second stitching row, the third stitching row and/or the fourth stitching row, have a continuous seam type i.e. a thread is present along the whole length of the upper and lower surface of the non-woven fabric. The seam size may be the same or vary along the length of the stitching row.

In some embodiments, the first stitching row, the second stitching row, the third stitching row and/or the fourth stitching row, have a non-continuous seam type, i.e. a thread is only present along some of the length of the upper and lower surface of the non-woven fabric. The seam size may be the same or vary along the length of the stitching row.

In some embodiments, the seam size of the first stitching row, the second stitching row, the third stitching row and/or the fourth stitching row, varies along the length of the stitching row. For example, such that every other seam has one seam size and the remaining seams have another seam size. Thereby, the space between each seam and the thread present on the upper and lower surface will vary.

In some embodiments, the first stitching row has a larger seam size than the second stitching row.

Each stitching row comprises at least one thread i.e. a primary thread. However, a stitching row may comprise more than one thread, such as further comprise a secondary thread, a tertiary thread, and/or a quaternary thread etc.

Each of the threads may comprise or essentially consist of binding agent or alternatively may not comprise any binding agent. However, at least one thread of the non-woven fabric, e.g. the first primary thread of the first stitching row, comprises or essentially consists of binding agent.

The binding agent may be a thermoplastic material. The binding agent may be stable at room temperature. The binding agent has a melting temperature. To make the binding agent adhesive and to have it bind adjacent layers of fabric, the binding agent is to be heated to a temperature above the melting temperature of the binding agent. The melting temperature of the binding agent may be more than room temperature, such as more than 40 degrees. For example, the melting temperature of the binding agent may be between 45-180 degrees Celsius, such as between 55-165 degrees Celsius, such as between 55-90 degrees Celsius. For example, the melting temperature of the binding agent may be approximately 60 degrees Celsius, or 85 degrees Celsius, or 110 degrees Celsius, or 135 degrees Celsius, or 140 degrees Celsius, or 160 degrees Celsius.

In some embodiments, the binding agent is soluble by a resin, such as a thermosetting resin, such as epoxy resin, polyester resin, MMA based resin or vinyl ester resin.

In some embodiments, the binding agent is a co-polyester. In some embodiments the binding agent is a co-polyamide. In some embodiments the binding agent is a combination of a co-polyester and a co-polyamide.

A thread essentially consisting of binding agent, will melt during heating above the melting temperature of the binding agent. Thereby, the stitching pattern provided by the thread will dissolve and be replaced by adherence between the fibres and layers.

In some embodiments, the first primary thread consists essentially of the binding agent. In some embodiments, a second and/or third primary or more threads, such as all threads, consist essentially of the binding agent.

A thread not comprising binding agent may be denoted a structurally stable thread. The structurally stable thread may be made by a material having a melting temperature higher than the melting temperature of the binding agent. For example, the melting temperature of the structurally stable thread may be more than 100 degrees Celsius higher than the melting temperature of the binding agent, such as 200 degrees Celsius higher than the melting temperature of the binding agent. The melting temperature of the structurally stable thread may be more than 160 degrees Celsius, such as more than 200 degrees Celsius, such as more than 250 degrees Celsius. In some embodiments, a pressure, e.g. between −1 bar vacuum to +8 bar, is also applied during heating, such that the binding agent melt under a combination of heat and pressure.

Preferably, in heating the non-woven fabric to make the binding agent adhesive, the non-woven fabric is heated to a temperature above the melting temperature of the binding agent but below the melting temperature of the structurally stable thread. Thereby, the structurally stable threads maintain stability within the non-woven fabric while the binding agent is able to bind adjacent fabrics together.

In some embodiments, the structurally stable thread is soluble or partly soluble by the resin, such as the thermosetting resin, such as epoxy resin, polyester resin or vinyl ester resin.

For example, the structurally stable thread, i.e. the thread not comprising binding agent, may be a polyester thread, such as a high tenacity polyester thread.

In some embodiments, it may be advantageous to have a thread comprising both binding agent and a structurally stable thread. In this way, the fibres of the layers of the non-woven fabric will remain stitched together after heating, due to the presence of the structural fibres, while also exhibiting adherent properties to a desired extent. For example, a thread comprising both binding agent and a structurally stable thread may be provided by coating the structurally stable thread with the binding agent. The coating should be thin and uniform. The thread may be coated with the binding agent, by pulling the thread through a melt bath comprising the binding agent.

In some embodiments, a thread, e.g. the first primary thread, comprises a first filament, e.g. a structurally stable thread, coated with the binding agent. In some embodiments, a thread, e.g. the first primary thread, comprises a first filament, e.g. a structurally stable thread, and a second filament, wherein the second filament comprises or consists essentially of the binding agent. The first filament and the second filament may be wound together.

In some embodiments, it may be advantageous to have a combination of some threads comprising or essentially consisting of binding agent and some threads comprising a structurally stable thread. In this way, the fibres of the layers of the non-woven fabric will remain stitched together after heating, due to the presence of the structurally stable threads, while also exhibiting adherent properties as desired, e.g. in areas desired.

In some embodiments, each stitching row comprises a primary thread comprising binding agent. In other embodiments, each alternating stitching row comprises a primary thread comprising binding agent. In still other embodiments, other patterns of stitching rows comprising and not comprising binding agent can be made. In this way, the non-woven fabric can be designed such that the concentration of binding agent of the non-woven fabric can be controlled by the distance between each stitching row comprising a thread comprising binding agent.

For some stitching row patterns, only one thread i.e. a primary thread, is needed for each stitching row. For example, this is the case for a straight line or a zig-zag stitching row pattern.

In some embodiments, the first primary thread forms a substantial straight line along the first stitch direction.

In some embodiments, the first primary thread forms a zig-zag pattern along the first stitch direction, e.g. having a width of 0.2-0.5 cm.

For some stitching row patterns, more than one thread may be necessary for each stitching row. For example, for a diamond shaped stitching row pattern, two threads are needed to form the pattern, i.e. a primary and a secondary thread. The primary thread and the secondary thread then mutually form a diamond pattern along a direction, e.g. having a width of 0.2-0.5 cm. The primary and secondary thread may be made from the same or different materials i.e. may each comprise or essentially consist of binding agent or may not comprise any binding agent.

In some embodiments, the one or more first threads comprise a first secondary thread, and wherein the first primary thread and the first secondary thread mutually form a diamond pattern along the first stitch direction, e.g. having a width of 0.2-0.5 cm.

In some embodiments, both the first primary and the first secondary thread comprise binding agent. In other embodiments, the first primary thread comprises binding agent, while the first secondary thread does not.

Furthermore, more than one thread may also be used for stitching row patterns, only needing one thread. For example a primary thread may be used from one edge of the non-woven fabric to an intermediate position along the stitching row and a secondary thread of another material may be used from the intermediate position along that stitching row to another edge of the non-woven fabric. This is advantageous, as threads with different material can be used, for example a primary thread comprising a binding agent and a secondary thread not comprising a binding agent. In this way, the non-woven fabric can be designed such that different areas of the non-woven fabric comprise binding agent, while other areas do not, simply by changing the thread used. Furthermore, a third, quaternary, quinary etc. thread may be used, comprising or not comprising binding agent.

In some embodiments, the second primary thread and the first primary thread are of different types, e.g. the second primary thread does not comprise binding agent.

In some embodiments, the relative amount of binding agent in the non-woven fabric is between 0.1-5 wt %, such as between 0.2-3 wt %, such as between 0.5-2 wt %.

In some embodiments, a first fabric area and a second fabric area, wherein the first area comprises a first relative amount of binding agent, and the second area comprises a second relative amount of binding agent, and wherein the first amount is larger than the second amount.

In preferred embodiments, essentially all the binding agent in the non-woven fabric is binding agent of threads of the plurality of stitching rows. However, in some embodiments, binding agent may also be applied to the one or more layers by other means, such as being sprayed or sprinkled on the layers.

As can be understood from above, the present invention exploits the stitching pattern as a means for designing a non-woven fabric comprising binding agent in desired areas. For example, the non-woven fabric may be designed such that some areas comprise a higher amount of binding agent than others, by using several different threads, some with and some without binding agent and/or some with a high amount and some with a low amount of binding agent in a stitching row and/or by having some stitching rows with and some without binding agent. The fabric may also be designed such that the amount of binding agent is uniform across the entire non-woven fabric to eliminate variations which are present when binding agent is sprayed on fibre layers. Furthermore, the manufacturing time of preforms, using a non-woven fabric is greatly reduced, since the fibre layers need not to be sprayed with binding agent between laying up each layer.

The plurality of fibres of the one or more fibre layers are preferably glass fibres, carbon fibres or hybrid fibres, such as a combination of glass fibres and carbon fibres.

In a second aspect, the present invention relates to a method of manufacturing a non-woven fabric, the method comprising:

laying up one or more fibre layers including laying up a first fibre layer comprising a first plurality of fibres optionally arranged along a first fibre direction;

stitching the one or more fibre layers to maintain arrangement of the plurality of fibres by a plurality of stitching rows including a first stitching row arranged along a first stitch direction, the first stitching row comprising one or more first threads including a first primary thread, the first primary thread comprising a binding agent.

In some embodiments, laying up the one or more fibre layers includes only laying up a single layer i.e. the first fibre layer before stitching the first fibre layer to maintain arrangement of the first plurality of fibres relative to each other.

In some embodiments, laying up the one or more fibre layers includes laying up a second fibre layer on top of the first fibre layer before stitching the two fibre layers to maintain arrangement of the first plurality of fibres relative to each other, to maintain arrangement of the second plurality of fibres relative to each other and to fix the first and second fibre layers relative to each other.

In some embodiments, laying up the one or more fibre layers includes further laying up a third and/or fourth and/or fifth and/or sixth fibre layer on top of another fibre layer before stitching all the fibre layers to maintain arrangement of the first, second, third and/or fourth and/or fifth and/or sixth plurality of fibres relative to each other and to fix all the fibre layers relative to each other.

In some embodiments, the plurality of fibres in each fibre layer may further be stitched together before the fibre layers are arranged on top of each other and stitched together by the plurality of stitching rows.

The preferred stitch direction of the plurality of stitching rows and the use of threads and binding agent in the non-woven fabric are described in detail above in relation to the non-woven fabric and also applies to the method of manufacturing a non-woven fabric.

In a third aspect, the present invention relates to a preform for a wind turbine blade component, wherein the preform comprises a stack of consolidated fibre sheets and wherein one or more of the fibre sheets are non-woven fabrics according to the first aspect of the present invention. Thus, in the simplest form the non-woven fabric of the third aspect of the present invention comprises one or more fibre layers each comprising a plurality of fibres optionally arranged along a fibre direction (i.e. the individual fibres may extend along the fibre direction), wherein the non-woven fabric comprises a plurality of stitching rows, each stitching row comprising one or more threads arranged along a stitch direction, for maintaining arrangement of the plurality of fibres in the one or more fibre layers relative to each other, wherein at least one thread comprises a binding agent. However, the non-woven fabric of the third aspect of the present invention may also comprise any combination of features described in embodiments in relation to the first aspect of the present invention.

In some embodiments every fibre sheet is a non-woven fabric according to the first aspect of the present invention. In some embodiments, each alternating sheet may be a non-woven fabric according to the first aspect of the present invention. In some embodiments, less than each alternating sheet may be a non-woven fabric according to the first aspect of the present invention.

The preform preferably comprises between 10-100 e.g. at least 10 fibre sheets, such as between 20-100 fibre sheets, e.g. at least 10 fibre sheets arranged on top of each other.

A consolidated stack of fibre sheets is herein defined as a plurality of fibre sheets arranged on top of each other and being adhered to each other by means of binding agent in a way sufficient for the stack of fibre sheets to be handled as a single element without the fibre sheets separating when handled e.g. lifted from one position to another. This may be achieved by heating and optionally further applying pressure to the stack of fibre sheets.

Preferably, at least each alternating sheet of the stack of fibre sheets is a non-woven fabric according to the present invention. In this way, when the stack of fibre sheets arranged on top of each other is heated to or above the melting temperature of the binding agent comprised in the non-woven fabrics, the binding agent present in the non-woven fabric melts. A pressure, e.g. between −1 bar vacuum to +8 bar, may also be applied during heating, such that the binding agent melts under a combination of heat and pressure. When the temperature decreases again, the binding agent becomes solid or semi-solid again and adheres the fibre sheets to each other in areas where the binding agent is present in at least one of two adjacent sheets. This is also a reason why, preferably, each alternating sheet is a non-woven fabric according to the present invention. In this way, all the fibre sheets will adhere to each other after heating and form a consolidated stack of fibre sheets i.e. a preform of a pre-defined shape to use as a fibre-reinforced component of a wind turbine blade, such as part of a spar cap or part of a wind turbine blade shell.

In some embodiments, the preform comprises non-woven fabrics in more than each alternating fibre sheet, such as in every fibre sheet of the preform. The plurality of non-woven fabrics in the stack may comprise binding agent in the same areas, or in different areas.

It is possible to have two fibre sheets not comprising the binding agent on top of each other in the preform. However, in such case, other means, such as spraying of binding agent between the sheets when they are layed-up is preferred for allowing the layers to adhere to each other and become consolidated, which will increase the manufacturing time.

In a fourth aspect, the present invention relates to a method of manufacturing a preform for a wind turbine blade component, such as a wind turbine blade shell, the method comprising:
   positioning a plurality of fibre sheets on a moulding surface, wherein one or more of the fibre sheets are a non-woven fabric according to the first aspect of the present invention.
   heating the plurality of fibre sheets to a temperature equal to or above a melting temperature of the binding agent of the non-woven fabric layers. Preferably, the temperature is less than a melting temperature of any structural threads in the non-woven fabric. Optionally, a pressure of between −1 bar vacuum to +8 bar may also be applied during heating.

In some embodiments, the method further comprises cutting and/or shaping the plurality of fibre sheets, such as to provide a preform of desired shape and size.

In some embodiments, the method further comprises a step of providing one or more preform moulds, and wherein positioning the plurality of fibre sheets on a moulding surface, positioning the plurality of fibre sheets within the preform mould, such as positioning the plurality of fibre sheets on a moulding surface of the preform mould. The one or more preform moulds preferably have a moulding surface with a similar or identical curvature as at least part of a moulding surface of the wind turbine component.

In some embodiments, each alternating sheet may be a non-woven fabric according to the first aspect of the present invention.

In some embodiments, the method further comprises the step of removing the preform from the moulding surface, when the temperature of the preform has cooled to a temperature below the melting temperature of the binding agent, such as room temperature.

In some embodiments, heating the preform mould comprises heating to a temperature between 50-190 degrees Celsius, such as between 65-170 degrees Celsius, such as between 70-100 degrees Celsius. In some embodiments, the pressure of between −1 bar vacuum to +8 bar applied during heating is preferably different from atmospheric pressure e.g. above 1 bar or below 1 bar, such as between −1 and 0.5 bar or 1.5 and 8 bar.

Details of the fibre sheets, particularly the non-woven fabrics are described above in relation to the non-woven fabric and the preform and also applies to the method of manufacturing a preform according to the present invention.

In a fifth aspect, the present invention relates to a method of manufacturing a wind turbine blade component, such as a wind turbine blade shell, the method comprising:

providing a plurality of preforms according to the third aspect of the present invention and/or provided in accordance with the fourth aspect of the present invention;

providing a component mould, arranging the plurality of preforms in the component mould;

infusing the plurality of preforms with resin to form the wind turbine blade component; and curing the resin.

The component mould may comprise a moulding surface corresponding substantially to the outer shell part of a wind turbine blade shell half. Typically, the step of arranging one or more layers of fibre material in the mould for providing an outer shell includes laying several layers of fibre material successively onto the moulding surface of the mould. Normally, the fibre material may optionally be brought into contact with a binding agent before or during the fibre lay-up. However, using non-woven fabric of the present invention, a preform may easily be provided comprising a plurality of non-woven fabrics stacked and adhered together by binding agent already present in the fabric, without a need for applying binding agent. The preform may collectively be placed in the component mould to form the component.

Next, the preforms are injected with a curable resin, which preferably dissolves the binding agent.

In a sixth aspect, the present invention relates to a method of manufacturing a wind turbine blade component, such as a wind turbine blade shell, the method comprising:

providing a component mould for moulding the wind turbine blade component;

providing a plurality of fibre layers, including one or more non-woven fabrics according to the first aspect of the present invention;

arranging a first plurality of fibre sheets in the component mould in one or more layers and heating the component mould to a temperature at or above the melting temperature of the binding agent;

repeating the previous step until a desired thickness of the stacked fibre sheets is obtained;

infusing the plurality of preforms with resin to form the wind turbine blade component; and curing the resin.

For example, the non-woven fabrics according to the first aspect of the invention may be used as a tackifier in layup of the fibre sheets in the component mould.

The component mould may comprise a moulding surface corresponding substantially to the outer shell part of a wind turbine blade shell half. Typically, the step of arranging one or more layers of fibre material in the mould for providing an outer shell includes laying several layers of fibre material successively onto the moulding surface of the mould. Binding agent may be sprayed between each layer and the mould heated, such as to adhere the layers together. However, in the present invention, the step of spraying binding agent between each layer may be avoided, by using non-woven fabrics according to the present invention in at least each alternating layer.

The resin used according to the fifth or sixth aspect of the present invention may be a thermosetting or thermoplastic resin, preferably a thermosetting resin. In an embodiment of the invention, the thermosetting resin is selected from an ester-based resin, such as an unsaturated polyester resin, a vinyl ester resin or a urethane (meth)acrylate resin. In another embodiment, the resin may be a thermoplastic resin, such as nylon, PVC, ABS, polypropylene or polyethylene. In a preferred embodiment, the resin comprises a polyester, such as an unsaturated polyester. An unsaturated polyester resin may be cured by free radicals which are formed when organic peroxides decompose. The decomposition initiates a reaction by which unsaturated polyester molecules polymerize with styrene forming a three-dimensional structure.

The combination of binding agent in the non-woven fabric and the resin is preferably considered, such that the binding agent is soluble in the resin.

In some embodiments, infusing the plurality of preforms with resin is performed by vacuum assisted infusion.

It will be understood that any of the above-described features may be combined in any embodiment of the invention. In particular, features and embodiments described with regard to the non-woven fabric may also apply to the preform and the method of manufacturing a non-woven fabric, a preform or a wind turbine blade and vice versa.

As used herein, the term "wt %" means weight percent. The term "relative to the weight of the fibre material" means a percentage that is calculated by dividing the weight of an agent, such as a binding agent, by the weight of the fibre material. As an example, a value of 1 wt % of binding agent, is relative to the weight of the fibre material, corresponding to 10 g of binding agent per kilogram of fibre material.

DETAILED DESCRIPTION OF THE INVENTION

The invention is explained in detail below with reference to embodiments shown in the drawings, in which FIG. 1 shows a wind turbine, FIG. 2 shows a schematic view of a wind turbine blade, FIG. 3A-C shows a schematic view of a non-woven fabric comprising one fibre layer according to an embodiment of the present invention, FIG. 4A-C shows a schematic view of a non-woven fabric comprising two fibre layers according to an embodiment of the present invention, FIG. 5A-D is a schematic view of four embodiments of a stitching pattern according to the present invention, FIG. 6A-B is a schematic view of a non-woven fabric with different stitching row patterns, FIG. 7A-C is a schematic view of a non-woven fabric with different seam types and seam sizes, FIG. 8A-C is a schematic view of a non-woven fabric with different stitching patterns comprising thread with and without binding agent, FIG. 9A-B is a schematic cross-sectional view of a non-woven fabric and a preform according to an embodiment of the present invention, FIG. 10A-C is a schematic cross-sectional view of preforms arranged in a mould for moulding a blade part according to the present invention.

DETAILED DESCRIPTION

FIG. 1 illustrates a conventional modern upwind wind turbine according to the so-called "Danish concept" with a tower 400, a nacelle 600 and a rotor with a substantially horizontal rotor shaft. The rotor includes a hub 800 and three blades 1000 extending radially from the hub 800, each having a blade root 1600 nearest the hub and a blade tip 1400 furthest from the hub 800.

FIG. 2 shows a schematic view of a first embodiment of a wind turbine blade 1000 according to the invention. The wind turbine blade 1000 has the shape of a conventional wind turbine blade and comprises a root region 3000 closest to the hub, a profiled or an airfoil region 3400 furthest away from the hub and a transition region 3200 between the root region 3000 and the airfoil region 3400. The blade 1000 comprises a leading edge 1800 facing the direction of rotation of the blade 1000, when the blade is mounted on the hub, and a trailing edge 2000 facing the opposite direction of the leading edge 1800.

The airfoil region 3400 (also called the profiled region) has an ideal or almost ideal blade shape with respect to generating lift, whereas the root region 3000 due to structural considerations has a substantially circular or elliptical cross-section, which for instance makes it easier and safer to mount the blade 1000 to the hub. The diameter (or the chord) of the root region 3000 may be constant along the entire root area 3000. The transition region 3200 has a transitional profile gradually changing from the circular or elliptical shape of the root region 3000 to the airfoil profile of the airfoil region 3400. The chord length of the transition region 3200 typically increases with increasing distance r from the hub. The airfoil region 3400 has an airfoil profile with a chord extending between the leading edge 1800 and the trailing edge 2000 of the blade 1000. The width of the chord decreases with increasing distance r from the hub.

A shoulder 4000 of the blade 1000 is defined as the position, where the blade 1000 has its largest chord length. The shoulder 4000 is typically provided at the boundary between the transition region 3200 and the airfoil region 3400.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

FIG. 3A illustrates an embodiment of a non-woven fabric 2 comprising a single fibre layer i.e. a first fibre layer 10. A close up of the fibre layer 10 in the area A is illustrated in FIG. 3B. The first fibre layer 10 comprises a first plurality of fibres 11 arranged adjacent to each other and in close proximity along a first fibre direction 12 (see FIG. 3C).

The first plurality of fibres 11 are stitched together by a plurality of stitching rows such as to maintain the arrangement of the plurality of fibres relative to each other in the first fibre direction 12, such as to form a coherent layer structure i.e. the non-woven fabric. In the embodiment shown in FIG. 3A, the plurality of stitching rows, includes a first, second and third stitching row 50, 60, 70. The first stitching row 50 is arranged along a first stitch direction 55 perpendicular to the first fibre direction 12. The second stitching row 60 is arranged along a second stitch direction 65 and the third stitching row 70 is arranged along a third stitch direction 75. In the present embodiment, the second and third stitch direction 65, 75 are parallel to the first stitch direction 55. Thus, a first plurality of stitching rows, including the first, second and third stitching row 50, 60, 70, are all arranged parallel to each other along the first stitch direction 55 of the non-woven fabric and all extend from a primary edge 3 of the non-woven fabric to a secondary edge 4 of the non-woven fabric 2 e.g. along the whole width of the non-woven fabric 2.

FIG. 3C schematically illustrates the first fibre direction 12 relative to the first stitch direction 55. In FIG. 3C, the angle between the first fibre direction 12 and the first stitch direction 55 is 90 degrees. When the non-woven fabric 2 only comprises a single fibre layer, a stitch direction perpendicular to the fibre direction offers a particularly strong fabric. However, in other embodiments, the stitch direction 55 may be arranged with a different angle a compared to the first fibre direction 12, preferably with a smallest angle between 30-90 degrees. Furthermore, different stitching rows may have different stitching directions and some stitching rows may cross other stitching rows.

In FIG. 3A, the stitching rows are arranged with a distance from each other which is the same between each stitching row, such as to provide a uniform stitching pattern across the non-woven fabric. In this way, the non-woven fabric will have at least some of the same properties, such as strength, throughout the non-woven fabric. Furthermore, the plurality of stitching rows 50, 60, 70 all extend from the primary edge 3 to the secondary edge 4 of the non-woven fabric 2.

The stitching rows 50, 60, 70 all comprise one or more threads including a primary thread. Thus, the first stitching row 50 comprises a first primary thread 51, the second stitching row comprises a second primary thread 61 and the third stitching row comprises a third primary thread 71. At least one or more of the primary threads 51, 61, 71, such as the first primary thread 51 of the first stitching row 50, comprises a binding agent. By using a thread comprising a binding agent in one or more areas of the non-woven fabric 2, the amount of binding agent within different areas of the non-woven fabric can be controlled. In this way, the rigidity and adherence properties of the non-woven fabric can also be controlled.

FIG. 4A illustrates an embodiment of a non-woven fabric 2 comprising more than one fibre layer, such as two fibre layers, including a first fibre layer 10 and a second fibre layer 20. The first fibre layer 10 comprises a first plurality of fibres (not shown) arranged adjacent to each other and extending along a first fibre direction 12. The second fibre layer 20 comprises a second plurality of fibres (not shown) arranged adjacent to each other and extending along a second fibre direction 22, being perpendicular to the first fibre direction 12.

The first plurality and second plurality of fibres are stitched together by a plurality of stitching rows such as to maintain the arrangement of the plurality of fibres in each layer relative to each other and such as to maintain the arrangement of the plurality of fibres in the two fibre layers relative to each other. In the embodiment shown in FIG. 4B, the plurality of stitching rows includes a first plurality of stitching rows including a first, second and third stitching row 50, 60, 70 all arranged parallel to each other along a first stitch direction 55 (FIG. 4C). The plurality of stitching rows is separated by a distance which is substantially the same between each stitching row.

FIG. 4C schematically illustrates the first fibre direction 12, the second fibre direction 22 and the first stitch direction 55. In FIG. 4C, the fibre angle a between the first fibre direction 12 and the second fibre direction 22 is 90 degrees. When the non-woven fabric comprises two or more fibre layers, the stitch direction is preferably offset from one of the fibre directions by half the fibre angle. Thus, as the fibre angle a between the first layer 10 and the second layer 20 is 90 degrees, the plurality of stitching rows are preferably arranged in a stitch direction being 45 degrees relative to each of the first and/or second fibre direction 12, 22, as illustrated in FIG. 4B. This is advantageous, as such a stitch direction relative to the direction of the plurality of fibres in the first and second fibre layer provides a strong fabric.

FIG. 5 illustrates four different stitching patterns in a non-woven fabric comprising one or more fibre layers, each comprising a plurality of fibres arranged along respective fibre directions. The stitching patterns illustrated in FIG. 5 are different embodiments of stitching patterns to illustrate the diversity which may exist between different embodiments of the present invention.

In FIG. 5A, the non-woven fabric comprises a plurality of stitching rows, including a first plurality of stitching rows extending along a first stitch direction and a second plurality of stitching rows extending along a second stitch direction. The first plurality of stitching rows includes a first, second, third, fourth and fifth stitching row 50a, 60a, 70a, 80a, 90a, and the second plurality of stitching rows includes a first, second and third stitching row 50b, 60b, 70b. The distance between each stitching row is substantially the same. Each of the first plurality of stitching rows extends from a primary edge 3 to a secondary edge 4 of the non-woven fabric 2.

In FIG. 5B, the non-woven fabric comprises a plurality of stitching rows, including a first plurality of stitching rows extending along a first stitch direction and a second plurality of stitching rows extending along a second stitch direction. The first plurality of stitching rows includes a first, second, third and fourth stitching row 50a, 60a, 70a, 80a, whereas the second plurality of stitching rows includes a first, second and third stitching row 50b, 60b, 70b, 80b. The distance between each stitching row is substantially the same.

In FIG. 5C, the non-woven fabric comprises a plurality of stitching rows, including a first plurality of stitching rows extending along a first stitch direction including a first, second, third, fourth and fifth stitching row 50, 60, 70, 80, 90. The distance between each stitching row is substantially the same.

In FIG. 5D, the non-woven fabric comprises a plurality of stitching rows, including a first plurality of stitching rows extending along a first stitch direction and a second plurality of stitching rows extending along a second stitch direction. The first plurality of stitching rows includes a first, second, third, fourth and fifth stitching row 50a, 60a, 70a, 80a, 90a whereas the second plurality of stitching rows includes a first, second, third, fourth and fifth stitching row 50b, 60b, 70b, 80b, 90b. Each of the first plurality of stitching rows extends from a primary edge 3 to a secondary edge 4 of the non-woven fabric and is arranged perpendicular to the second plurality of stitching rows. The second plurality of stitching rows extends from a tertiary edge 5 to a quaternary edge 6 of the non-woven fabric and is arranged perpendicular to the first plurality of stitching rows. The distance between each of the first plurality of stitching rows is substantially the same and the distance between each of the second plurality of stitching rows is substantially the same, but different from the distance between the first plurality of stitching rows.

FIGS. 6-8 show examples of how the amount of binding agent present on the surface of the non-woven fabric can be varied within different areas of the non-woven fabric, by varying the stitching patterns, stitch type, seam size, e.g. by using more than one thread with different material for one stitching row and/or varying the thread used in the different stitching rows.

FIG. 6A illustrates a non-woven fabric 2 comprising a plurality of stitching rows, including a first, second and third stitching row 50, 60, 70. The plurality of stitching rows 50, 60, 70 all extend along the same stitch direction i.e. a first stitch direction. The plurality of stitching rows 50, 60, 70 all extend from a primary edge 3 to a secondary edge 4 of the non-woven fabric 2. The distance between each stitching row is substantially the same. Each stitching row illustrated in FIG. 6 comprises a different stitching row pattern.

The first stitching row 50 has a zig-zag stitching row pattern with a width w (See FIG. 6B) and has a first primary thread 51.

The second stitching row 60 has a diamond shaped stitching row pattern having a width w (See FIG. 6B) and having a second primary thread 61 and a second secondary thread 62. The two threads 61, 62 may be made of the same material or may be made of different materials. For example, the second primary thread 61 may comprise binding agent whereas the second secondary thread 62 may not.

The third stitching row 70 comprises a straight stitching row pattern and have a third primary thread 71.

FIG. 7A illustrates a non-woven fabric 2 comprising a plurality of stitching rows, including a first, second and third stitching row 50, 60, 70. The plurality of stitching rows 50, 60, 70 all extend along the same stitch direction i.e. a first stitch direction. The plurality of stitching rows 50, 60, 70 all extend from a primary edge 3 to a secondary edge 4 of the non-woven fabric 2. The distance d between each stitching row is substantially the same.

Each stitching row 50, 60, 70 illustrated in FIG. 7 has the same stitching row pattern, i.e. a straight line, but all have different seam size ss and/or seam type.

The first stitching row 50 has a continuous seam type where a thread is present along the whole length of the upper surface of the non-woven fabric 2. The second stitching row 60 has a non-continuous seam type, wherein the thread is only present along some of the length of the upper surface of the non-woven fabric, since it is interrupted by small spaces without any thread. The third stitching row 70 also has a non-continuous seam type, which is only present along some of the length of the upper surface of the non-woven fabric, since it is interrupted by spaces without any thread. The seam size ss of the third stitching row 70 is larger than the seam size ss of the second stitching row 60 and each seam thus binds together more fibres than the smaller seams in the second stitching row 60. Furthermore, the seam size ss of the second stitching row is itself larger than the spaces between each seam and thus the third stitching row covers more of the surface than the second stitching row.

FIG. 7B illustrates a cross-sectional view of three non-woven fabrics 2a, 2b, 2c with a single fibre layer 12. The non-woven fabric 2a has no stitches along the cross-section. The non-woven fabric 2b has a stitching row with a non-continuous seam type i.e. a seam type wherein a thread is only present along some of the length of the upper and lower surface of the non-woven fabric, since it is interrupted by small spaces without any thread. The seam size ss varies along the stitching row, starting from the left with small seams, evolving to larger seams and then to smaller seams again. The non-woven fabric 2c shows a continuous seam, wherein a thread is present along the whole length of the upper and lower surface of the non-woven fabric and the seam size is continuously the same.

FIG. 7C illustrates a cross-sectional view of three non-woven fabrics 2a, 2b, 2c with two fibre layers including a first and a second fibre layer 10, 20. Apart from having two layers, the illustration in FIG. 7C is the same as that of FIG. 7B.

The seam size ss and stitch type contribute to determining the amount of thread being present at an upper or lower surface of the non-woven fabric i.e. in contact with one or two other layers. The seam size ss further determines the rigidity and strength of the fabric. The seam size ss is preferably between 0.05-0.5 cm. The stitch type may be any stitch type known by a person skilled in the art. In this way, the amount of binding agent present on the upper and lower surface of the non-woven fabric can be varied, simply by varying the seam size ss and/or stitch type.

FIGS. 8A-8C show a plurality of different embodiments of the present invention, where some areas comprise binding agent and other areas do not comprise binding agent or comprise a smaller amount of binding agent. The amount of binding agent in different areas may be controlled by using threads comprising binding agent in some stitching rows and using threads not comprising binding agent in other stitching rows, and/or by using more than one thread in each stitching row, where some threads comprise binding agent and other threads do not comprise binding agent.

FIG. 8A shows a non-woven fabric 2 comprising one or more layers. The plurality of fibres is stitched together by a plurality of stitching rows such as to maintain the arrangement of the plurality of fibres relative to each other, such as to form a coherent layer structure i.e. the non-woven fabric 2. In the embodiment shown in FIG. 8A, the plurality of stitching rows includes a first, second, third, fourth and fifth stitching row 50, 60, 70, 80, 90, all arranged parallel along a first stitch direction 55.

In FIG. 8A, the primary threads 51, 71, 91 of the first, third and fifth stitching row are illustrated by a thicker line than the primary thread 61, 81 of the second and fourth stitching row. This is, however, not to illustrate that some threads are actually thicker than others, but merely to illustrate that two types of threads with different properties are present. For example, the "thicker" threads may illustrate a thread comprising binding agent, while the "thinner" thread may illustrate a thread not comprising binding agent. In this way, some areas of the non-woven fabric comprise binding agent, while other areas do not, or comprise a smaller amount of binding agent. In FIG. 8A, the non-woven fabric 2 comprises binding agent in each alternating thread.

FIG. 8B shows a non-woven fabric 2 comprising one or more layers. The plurality of fibres is stitched together by a plurality of stitching rows, including a first and second plurality of stitching rows, such as to maintain the arrangement of the plurality of fibres relative to each other, such as to form a coherent layer structure i.e. the non-woven fabric 2. In the embodiment shown in FIG. 8B, the first plurality of stitching rows includes a first, second, third, fourth and fifth stitching row 50a, 60a, 70a, 80a, 90a, all arranged along a first stitch direction 55, whereas the second plurality of stitching rows also includes a first, second, third, fourth and fifth stitching row 50b, 60b, 70b, 80b, 90b, all arranged along a second stitch direction 65, being perpendicular to the first stitch direction 55.

In FIG. 8B, the primary threads of the first and fifth stitching row 61a, 91a, 61b, 91b in the first and second plurality of stitching rows, are illustrated by a thicker line than the remaining stitching rows. This is, however, not to illustrate that some threads are actually thicker than others, but merely to illustrate that two types of threads with different properties are present. For example, the "thicker" threads may illustrate a thread comprising binding agent, while the "thinner" thread may illustrate a thread not comprising binding agent. In this way, some areas of the non-woven fabric comprise binding agent, while other areas do not, or comprise a smaller amount of binding agent. In FIG. 8B, the areas comprising binding agent are areas close to the circumference of the non-woven fabric 2.

FIG. 8C shows a non-woven fabric 2 comprising one or more layers. The plurality of fibres is stitched together by a plurality of stitching rows such as to maintain the arrangement of the plurality of fibres relative to each other, such as to form a coherent layer structure i.e. the non-woven fabric 2. In the embodiment shown in FIG. 8C, the plurality of stitching rows, include a first, second, third, fourth and fifth stitching row 50, 60, 70, 80, 90, all arranged along a first stitch direction 55.

The first and fifth stitching row 50, 90 each comprises a primary thread, i.e. the first stitching row comprises a first primary thread 51 and the fifth stitching row comprises a fifth primary thread 91. The first primary thread 51 and the fifth primary thread 91 extend from a primary edge 3 to a secondary edge 4 of the non-woven fabric 2.

Furthermore, the second, third and fourth stitching rows 60, 70, 80 each comprises a primary, a secondary and a tertiary thread, e.g. the second stitching row comprises a second primary thread 61, a second secondary thread 62 and a second tertiary thread 63. The primary threads 61, 71, 81 of the first, second and third stitching row 60, 70, 80, respectively, extend from the primary edge 3 to a first intermediate position within the non-woven fabric 2. The tertiary threads 63, 73, 83 of the first, second and third stitching row 60, 70, 80, respectively, extend from the secondary edge 4 to a second intermediate position within the non-woven fabric 2. The secondary threads 62, 72, 82 of the first, second and third stitching row 60, 70, 80, respectively, extend from the first intermediate position to the second intermediate position in the non-woven fabric.

In FIG. 8C, the primary thread 51 of each stitching row, as well as the tertiary thread of the second, third and fourth stitching row, are illustrated as thicker than the secondary threads of the second, third and fourth stitching rows. This is not to illustrate that some threads are actually thicker than others, but merely to illustrate that two types of threads with different properties are present. For example, the "thicker" threads may illustrate a thread comprising binding agent, while the "thinner" thread may illustrate a thread not comprising binding agent. In this way, some areas of the non-woven fabric comprise binding agent, while other areas do not, or comprise a smaller amount of binding agent. In FIG. 8C, the areas comprising binding agent are the areas close to the circumference of the non-woven fabric.

Preforms comprising a plurality of fibre layers are arranged on the moulding surface followed by resin infusion and curing to form the outer shell of the wind turbine blade.

Figure 1:
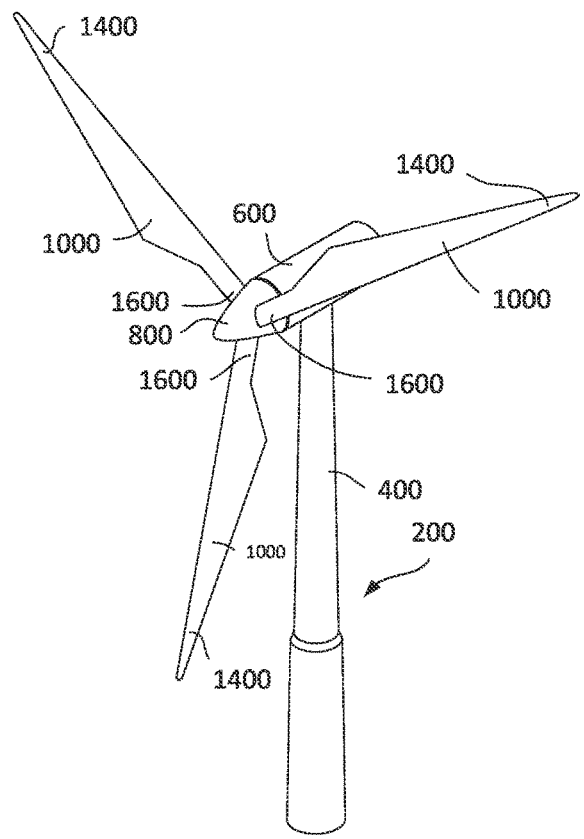
Figure 2:
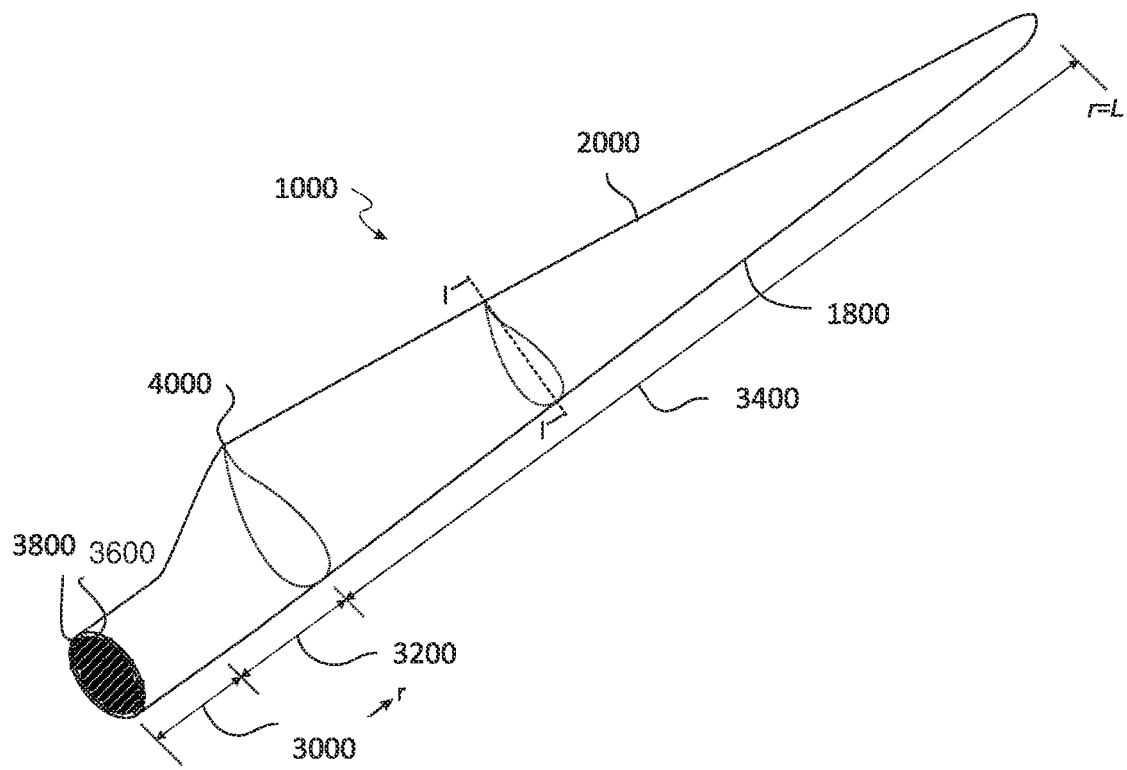
Figure 3:
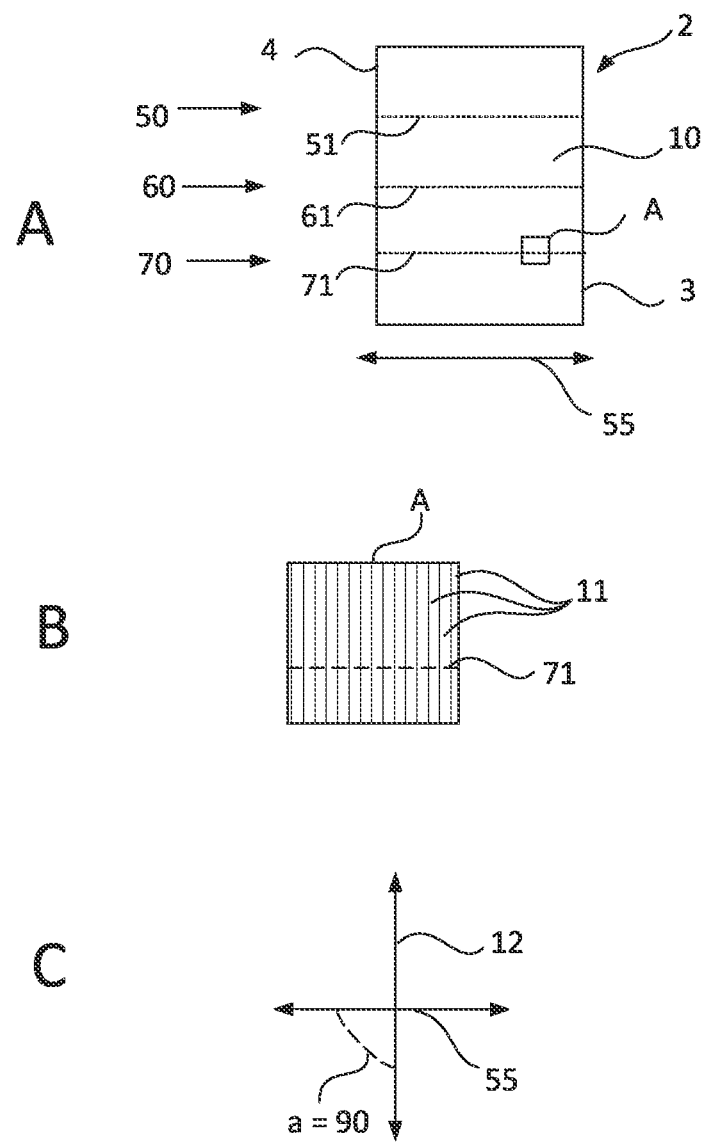
Figure 4:
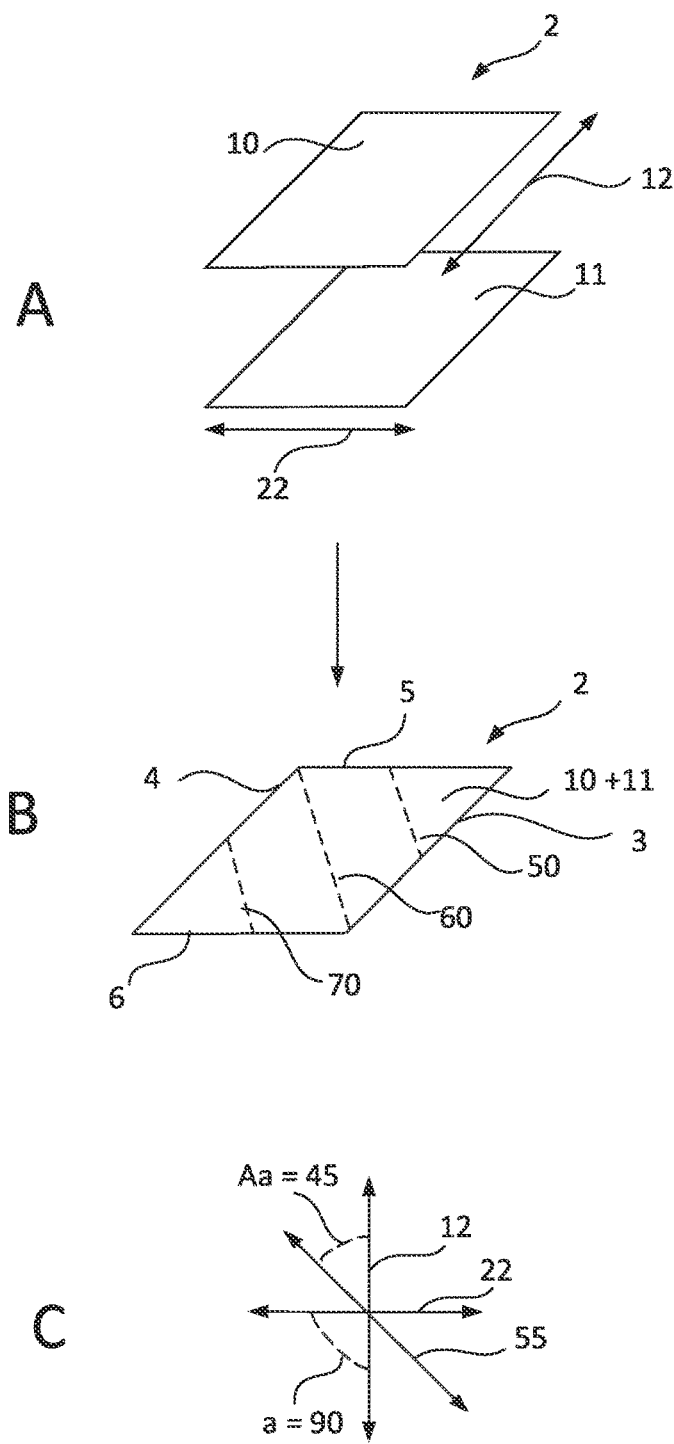
Figure 5:
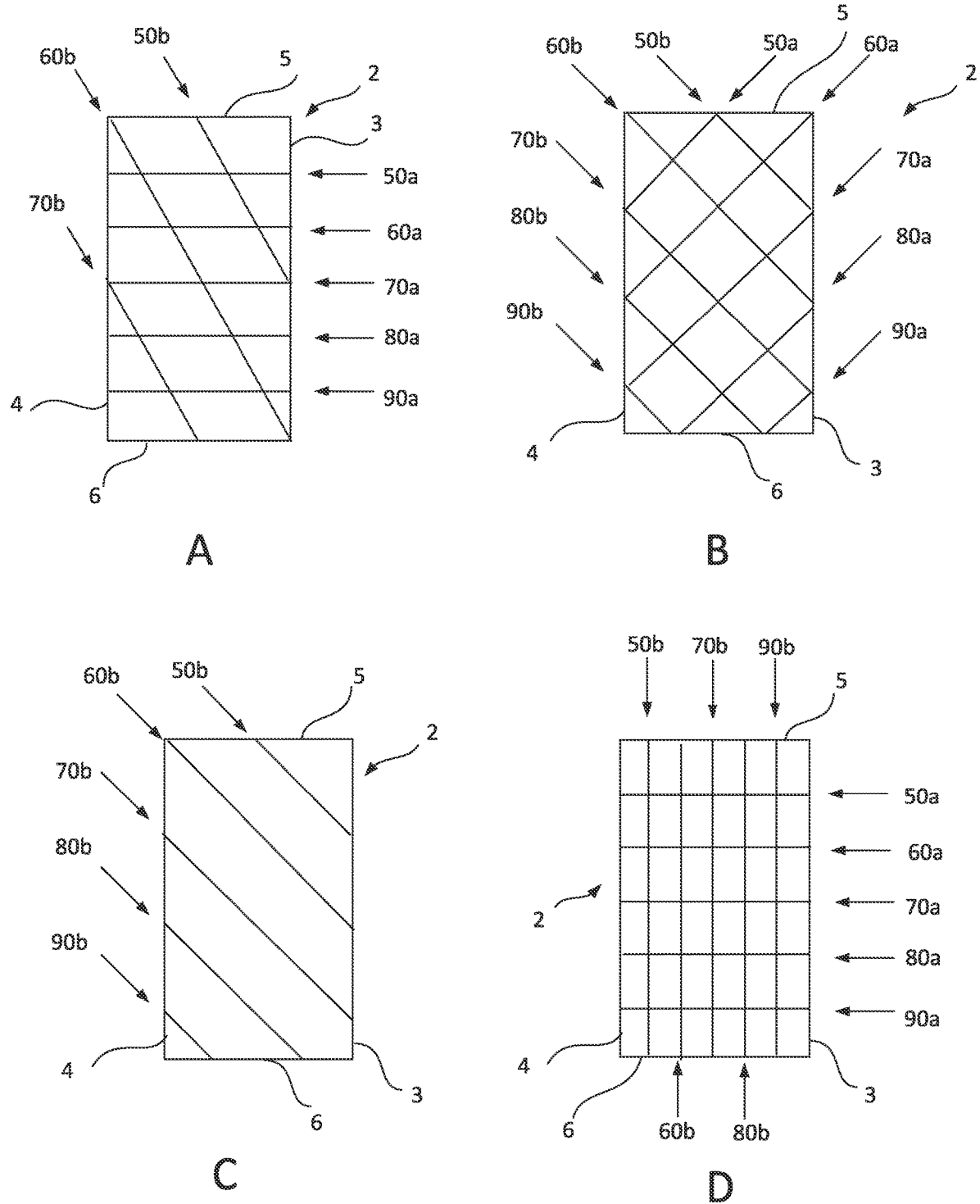
Figure 6:
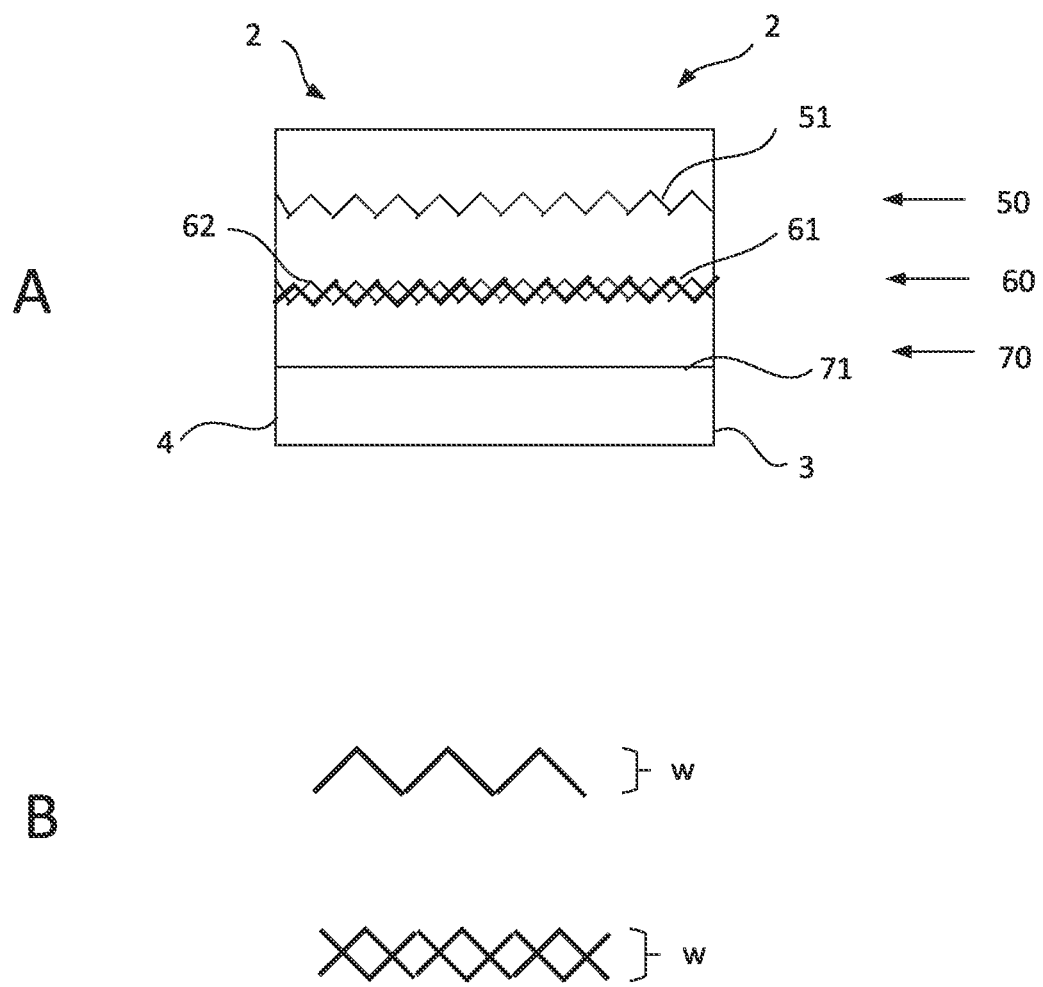
Figure 7:
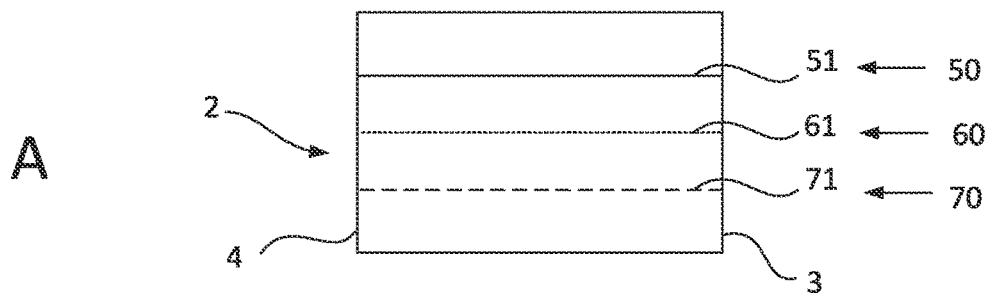
Figure 7:
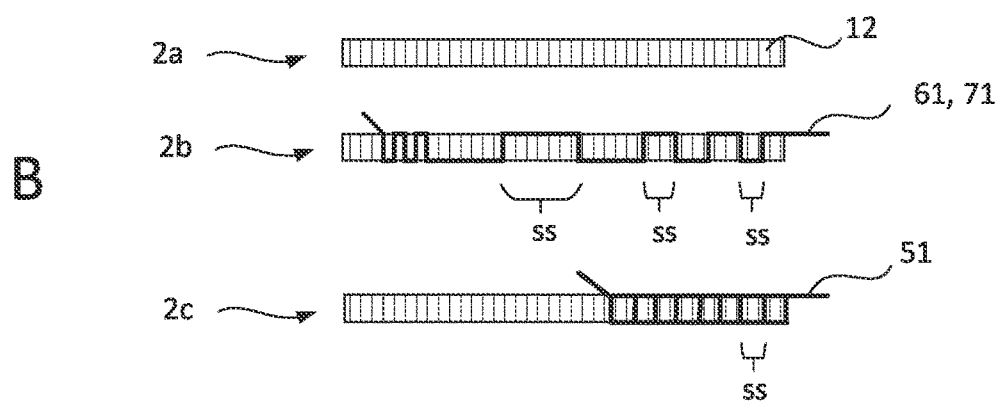
Figure 7:
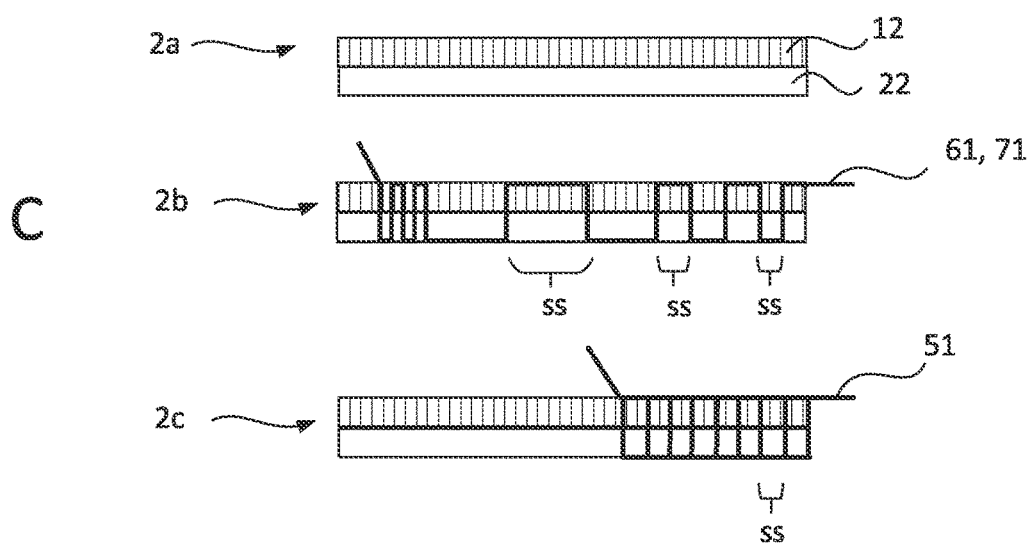
Figure 8:
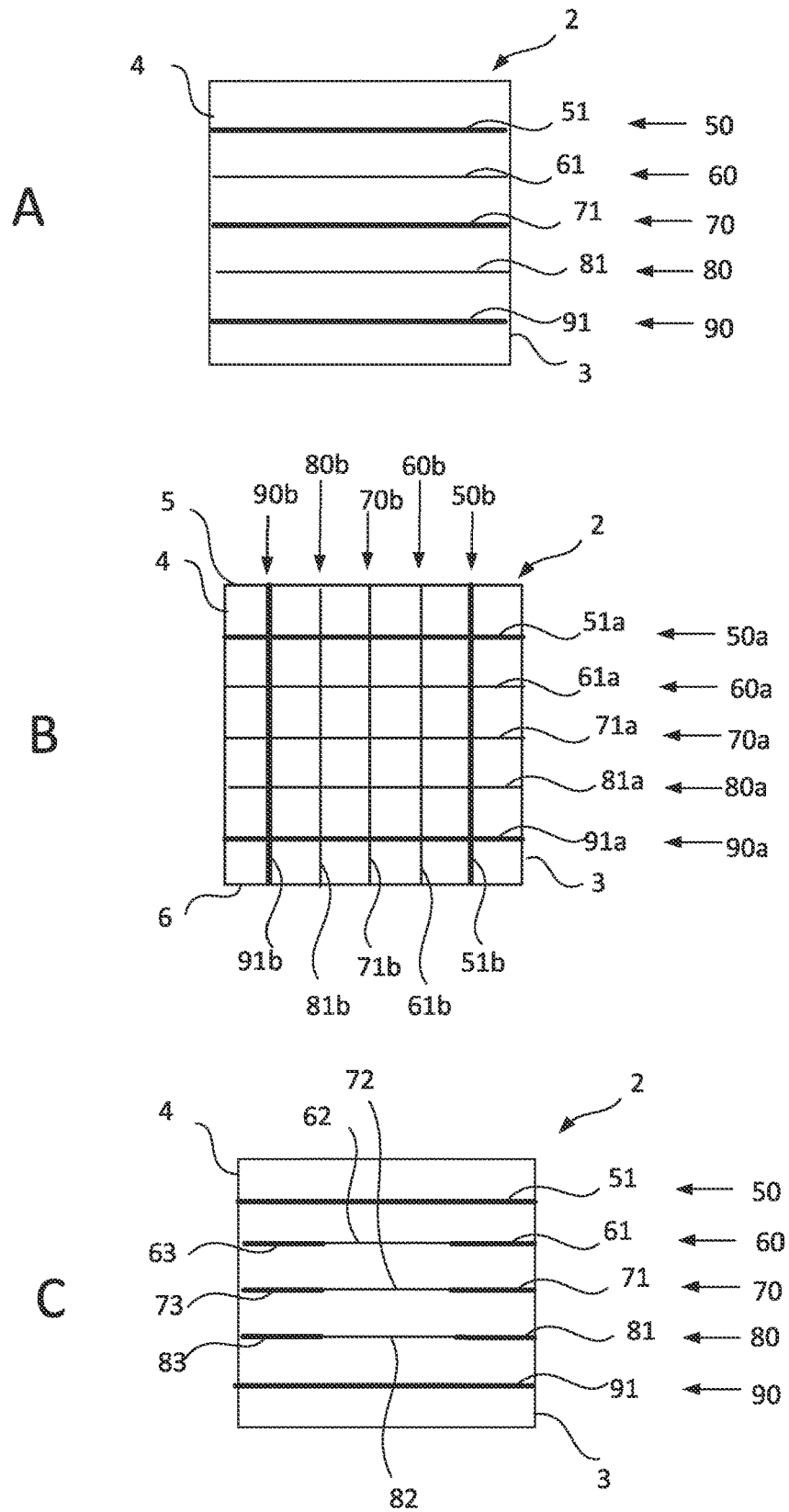
Figure 9:
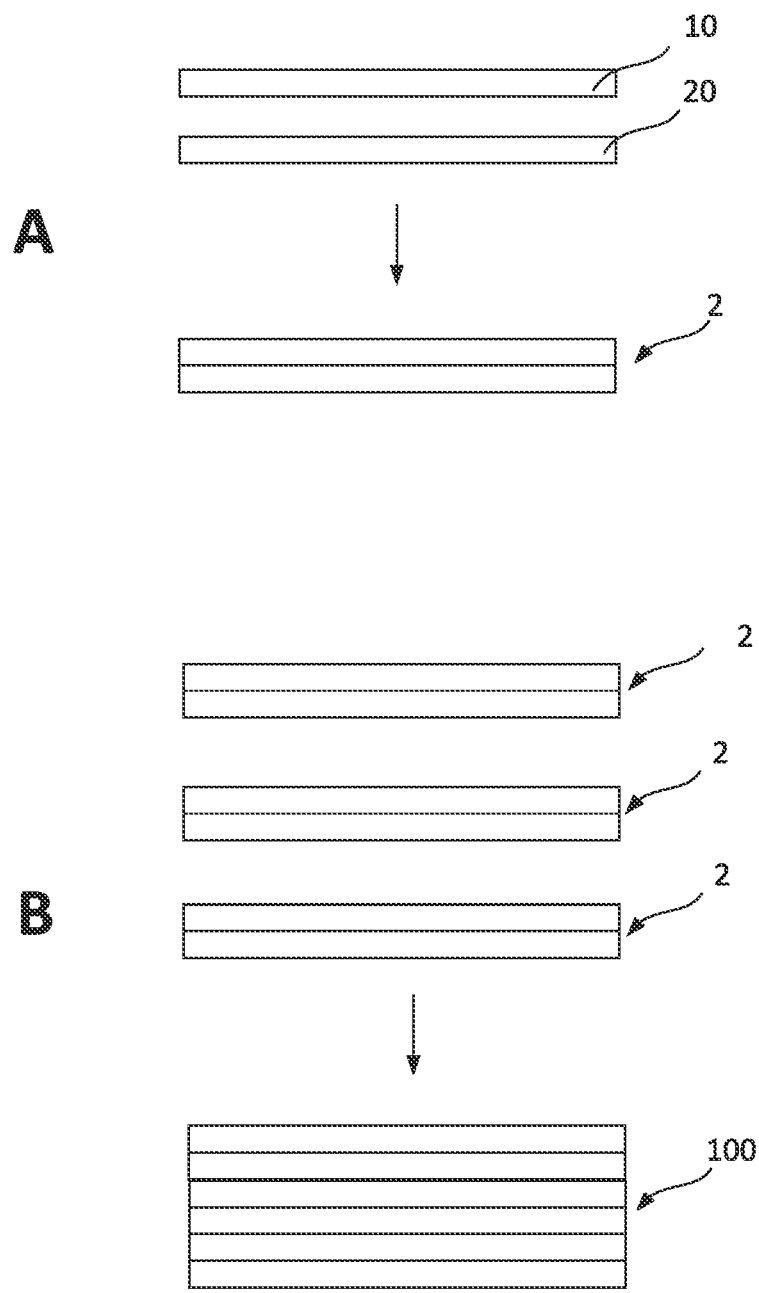
FIG. 9A is a schematic cross-sectional view of a first and a second fibre layer 10, 20 being arranged on top of each other and stitched together (stitching not shown) to form a non-woven fabric 2.
FIG. 9B is a schematic cross-sectional view showing that a plurality of non-woven fabrics is stacked to form a consolidated preform 100. Formation of the consolidated preform 100 may comprise heating the stacked non-woven fabrics.
Figure 10:
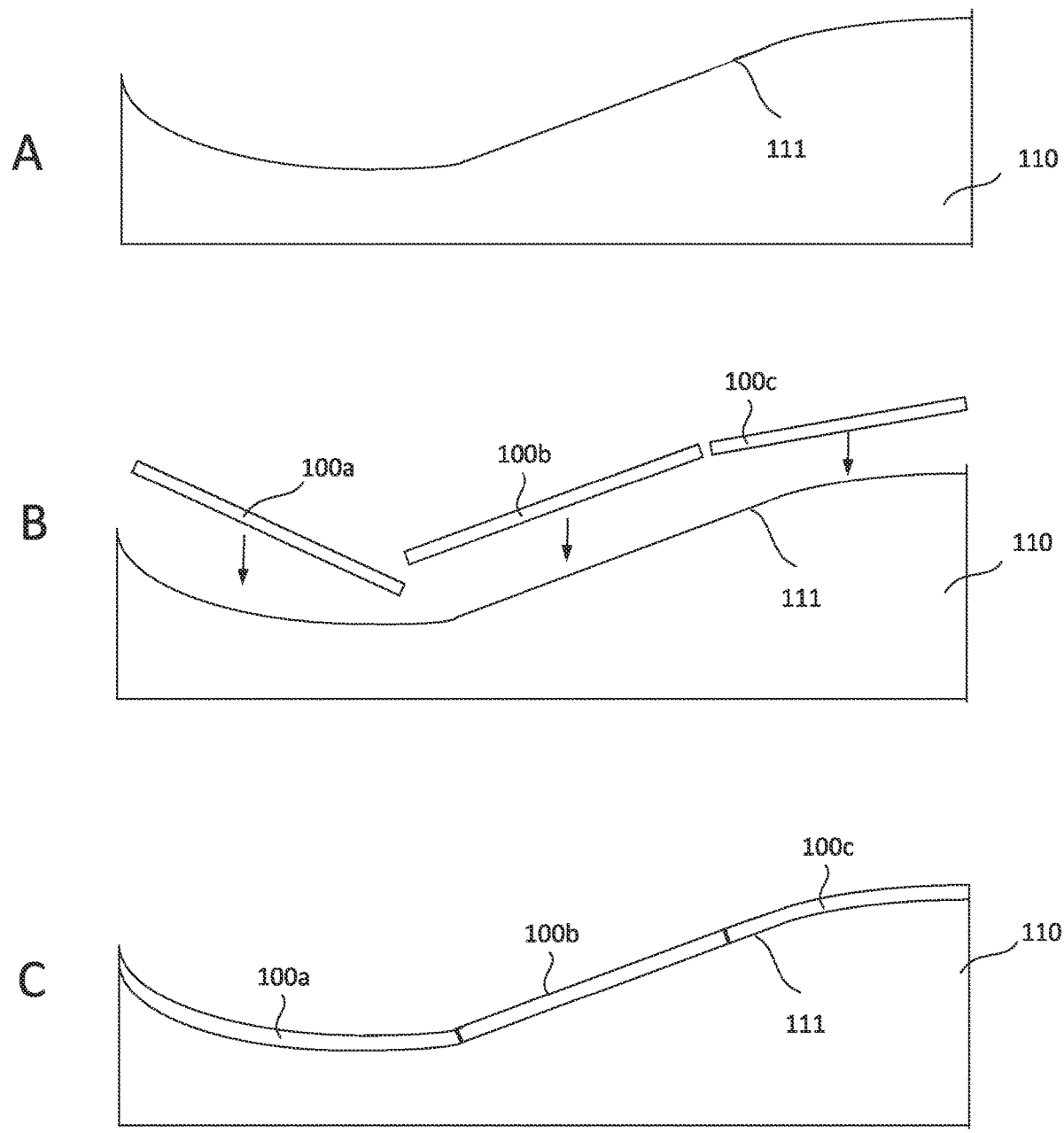
FIG. 10A is a schematic cross-sectional view through a mould 110 for use in a method of manufacturing a wind turbine blade part, such as a blade half shell. The mould comprises a moulding surface 111, which defines an outer surface of the finished wind turbine blade, here shown as the pressure side of the blade.

FIG. 10B shows three preforms 100a, 100b, 100c which are shaped and dimensioned such that they can be arranged on the moulding surface 111 and FIG. 10C shows the three preforms 100a, 100b, 100c arranged on the moulding surface 111. Afterwards, the preforms, optionally together with additional layers of fibre, are infused with resin, e.g. by vacuum assisted resin transfer moulding (VARTM).

It should be noted that a non-woven fabric according to the present invention may have dimensions between 0.5-50 meters in all directions (except from the thickness which is less than 0.6 cm). Preferably, the non-woven fabric has a thickness of less than 0.6 cm, a width of 0.5-1.5 meter and a length of 0.5-200 metre, such that it can be coiled up along the length direction. Thus, the number of stitching rows may be very large. Furthermore, the non-woven fabrics, although for illustrative purposes being shown as being rectangular objects, might also have other shapes.

LIST OF REFERENCE NUMERALS 2 non-woven fabric
3 primary edge
4 secondary edge
5 tertiary edge
6 quaternary edge
10 first fibre layer
11 first plurality of fibres
12 first fibre direction
20 second fibre layer
21 second plurality of fibres
22 second fibre direction
30 third fibre layer
31 third plurality of fibres
32 third fibre direction
40 fourth fibre layer
41 fourth plurality of fibres
42 fourth fibre direction
50 first stitching row
51 first primary thread
52 first secondary thread
53 first tertiary thread
54 first quaternary thread
55 first stitch direction
60 second stitching row
61 second primary thread
62 second secondary thread
63 second tertiary thread
64 second quaternary thread
65 second stitch direction
70 third stitching row
71 third primary thread
72 third secondary thread
73 third tertiary thread
74 third quaternary thread
75 third stitch direction
80 fourth stitching row
81 fourth primary thread
82 fourth secondary thread
83 fourth tertiary thread
84 fourth quaternary thread
85 fourth stitch direction
90 fifth stitching row
91 fifth primary thread
100 preform
110 preform mould
111 moulding surface
113 outer shell part
200 wind turbine
400 tower
600 nacelle
800 hub
1000 blade
1400 blade tip
1600 blade root
1800 leading edge
2000 trailing edge
2200 pitch axis
3000 root region
3200 transition region
3400 airfoil region
4000 shoulder/position of maximum chord
w width of stitching row pattern
ss seam size

The invention claimed is:

1. A non-woven fabric comprising one or more fibre layers including a first fibre layer comprising a first plurality of fibres arranged along a first fibre direction, wherein the nonwoven fabric comprises a plurality of stitching rows for maintaining arrangement of the plurality of fibres, the plurality of stitching rows includes a first stitching row arranged along a first stitch direction, the first stitching row comprises one or more first threads including a first primary thread, the first primary thread comprising a binding agent, and
   wherein the plurality of stitching rows comprise differing stitching rows such that the non-woven fabric comprises a first fabric area and a second fabric area, wherein the first fabric area comprises a first amount of the binding agent and the second fabric area comprises a second amount of the binding agent, wherein the first amount is larger than the second amount.

2. The non-woven fabric according to claim 1, wherein
   a. the first primary thread comprises a first filament coated with the binding agent, or
   b. the first primary thread comprises a first filament and a second filament, wherein the second filament consists essentially of the binding agent, the first filament and the second filament being wound together, or
   c. the first primary thread consists essentially of the binding agent.

3. The non-woven fabric according to claim 1, wherein the binding agent is a thermoplastic material and wherein the binding agent has a melting temperature between 55-165 degrees Celsius.

4. The non-woven fabric according to claim 1, wherein the binding agent is soluble in a polyester resin.

5. The non-woven fabric according to claim 1, wherein the binding agent is selected from a group consisting of co-polyester and co-polyamide.

6. The non-woven fabric according to claim 1, wherein the plurality of stitching rows further comprises a second stitching row arranged along a second stitch direction, the second stitching row comprises one or more second threads including a second primary thread.

7. The non-woven fabric according to claim 6, wherein the first and second stitch directions are parallel or wherein the first and second stitch directions are perpendicular.

8. The non-woven fabric according to claim 6, wherein the second primary thread and the first primary thread are of different types, wherein the first primary thread comprises the binding agent and the second primary thread does not comprise the binding agent.

9. The non-woven fabric according to claim 1, wherein a smallest angle between the first stitch direction and the first fibre direction is between 30 and 90 degrees.

10. The non-woven fabric according to claim 1, wherein the first primary thread forms a substantial straight stitching pattern along the first stitch direction or wherein the first primary thread forms a zig-zag stitching pattern along the first stitch direction.

11. The non-woven fabric according to claim 1, wherein the first stitching row and the second stitching row are separated by a distance of between 0.5-2 cm.

12. The non-woven fabric according to claim 1, wherein the relative amount of binding agent in the non-woven fabric is between 0.1-5 wt %.

13. The non-woven fabric according to claim 1, wherein the one or more layers include a second fibre layer comprising a second plurality of fibres arranged along a second fibre direction, and wherein the first fibre direction and the second fibre direction are offset by a first fibre angle, wherein the plurality of stitching rows maintains arrangement of the first plurality of fibres and the second plurality of fibres and wherein the first stitch direction and the first fibre direction are offset by half of the first fibre angle.

14. A preform for a wind turbine blade component comprising a stack of consolidated fibre sheets, wherein one or more of the fibre sheets is the non-woven fabric according to claim 1.

15. A method of manufacturing a wind turbine blade component, such as a wind turbine blade shell, the method comprising:
    providing a component mould for moulding the wind turbine blade component;
    providing a plurality of preforms according to claim 14;
    arranging the plurality of preforms in the component mould;
    infusing the plurality of preforms with resin to form the wind turbine blade component; and
    curing the resin.

16. A method of manufacturing a preform for a wind turbine blade component, such as a wind turbine blade shell, the method comprising:
    providing a preform mould;
    positioning a plurality of fibre sheets, wherein one or more of the fibre sheets is the non-woven fabric according to claim 1, into the preform mould; and
    heating the preform mould to a temperature equal to or above a melting temperature of the binding agent of the non-woven fabric and optionally applying a pressure of between −1 bar vacuum to +8 bar in the preform mould.

17. A method of manufacturing a non-woven fabric, the method comprising:
    laying up one or more fibre layers including laying up a first fibre layer comprising a first plurality of fibres arranged along a first fibre direction; and
    stitching the one or more fibre layers to maintain arrangement of the first plurality of fibres by a plurality of stitching rows including a first stitching row arranged along a first stitch direction and a second stitching row arranged along a second stitch direction, the first stitching row comprising one or more first threads including a first primary thread, the second stitching row comprises one or more second threads including a second primary thread, the first primary thread comprising a binding agent, wherein the stitching of the one or more fibre layers comprises varying the plurality of stitching rows such that the non-woven fabric comprises a first fabric area and a second fabric area, wherein the first fabric area comprises a first amount of binding agent and the second fabric area comprises a second amount of binding agent, and wherein the first amount is larger than the second amount.

18. The method according to claim 17, wherein laying up the one or more fibre layers includes laying up a second fibre layer on top of the first fibre layer, the second fibre layer comprising a second plurality of fibres arranged along a second fibre direction, and wherein stitching the one or more fibre layers maintains arrangement of the first plurality of fibres and the second plurality of fibres.

19. The method according to claim 17 wherein the second fibre layer is layed up such that the first fibre direction and the second fibre direction are offset by a first fibre angle, e.g. between 30-90 degrees.

\* \* \* \* \*